United States Patent
Gruppe et al.

(10) Patent No.: US 10,615,402 B2
(45) Date of Patent: Apr. 7, 2020

(54) BATTERY WATER-REFILL PLUG

(71) Applicant: Froetek Vermoegensverwaltung GmbH, Osterode am Harz (DE)

(72) Inventors: Joachim Gruppe, Bad Lauterberg (DE); Gerd Hoogestraat, Bad Lauterberg (DE); Thomas Koch, Northeim (DE); Sebastian Mathes, Kalefeld (DE); Peter Steffahn, Bad Lauterberg (DE); Sebastian Weny, Bad Lauterberg (DE)

(73) Assignee: FROETEK VERMOEGENSVERWALTUNG GMBH, Osterode am Harz (DE)

( * ) Notice: Subject to any disclaimer, the term of this patent is extended or adjusted under 35 U.S.C. 154(b) by 50 days.

(21) Appl. No.: 15/572,176

(22) PCT Filed: Feb. 18, 2016

(86) PCT No.: PCT/EP2016/000273
§ 371 (c)(1),
(2) Date: Feb. 24, 2018

(87) PCT Pub. No.: WO2017/050399
PCT Pub. Date: Mar. 30, 2017

(65) Prior Publication Data
US 2018/0190969 A1    Jul. 5, 2018

(30) Foreign Application Priority Data
Sep. 23, 2015    (DE) ........................ 10 2015 012 175

(51) Int. Cl.
*H01M 2/00*    (2006.01)
*H01M 2/36*    (2006.01)
*F16K 31/08*    (2006.01)

(52) U.S. Cl.
CPC .......... *H01M 2/362* (2013.01); *F16K 31/086* (2013.01); *H01M 2/365* (2013.01)

(58) Field of Classification Search
CPC ...... H01M 2/362; H01M 2/365; H01M 2/368; H01M 2/367; H01M 2/361; H01M 2/36; F16K 31/086
See application file for complete search history.

(56) References Cited

U.S. PATENT DOCUMENTS

| 448,369 A | 3/1891 | Regan |
| 2,103,672 A | 12/1937 | Heraeus |

(Continued)

FOREIGN PATENT DOCUMENTS

| DE | G23841 A | 11/1882 |
| DE | 23841 A | 11/1892 |

(Continued)

*Primary Examiner* — Raymond Alejandro
(74) *Attorney, Agent, or Firm* — Andrew Wilford

(57) ABSTRACT

A water-refill plug for automatically filling and refilling the cells of the battery has a housing forming a valve seat, and forming an upper and lower guides above and below the valve seat. A float is movable vertically in the housing below the seat in one of the cells of the battery. A valve body vertically movable independently of the float body has upper and lower end vertically slidable in the upper and lower guides. A magnetically attractable or repellable element or permanent magnet is provided on one of the bodies. Another permanent magnetic on the other of the bodies exerts a force via the element or magnet so the valve body is moved by the float body.

6 Claims, 2 Drawing Sheets

(56) References Cited

U.S. PATENT DOCUMENTS

| | | |
|---|---|---|
| 2,374,513 A | 4/1945 | Vieth |
| 3,968,687 A | 7/1976 | Fester |
| 4,055,708 A | 10/1977 | Yamamoto |
| 4,359,071 A | 11/1982 | d'Arcy et al. |
| 4,481,389 A * | 11/1984 | Johnson ................ F16K 31/086 |
| | | 200/61.86 |
| 4,512,378 A | 4/1985 | Oschmann |
| 8,564,390 B1 * | 10/2013 | McDannald .......... F16K 21/185 |
| | | 335/205 |
| 9,200,723 B2 | 12/2015 | Pule et al. |

FOREIGN PATENT DOCUMENTS

| | | |
|---|---|---|
| DE | 3027351 A | 2/1981 |
| DE | 3027351 A1 | 2/1981 |
| DE | 3539167 A | 5/1986 |
| DE | 3539167 A1 | 5/1986 |
| DE | 4225019 A | 2/1993 |
| DE | 4225019 A1 | 2/1993 |
| DE | 4207346 A | 9/1993 |
| DE | 4207346 A1 | 9/1993 |
| DE | 9405730 U | 7/1994 |
| DE | G9405730.3 U1 | 7/1994 |
| DE | 19731248 A | 1/1999 |
| DE | 19731248 A1 | 1/1999 |
| DE | 102006020354 A | 10/2007 |
| DE | 102006020354 A1 | 10/2007 |
| DE | 102014212690 A | 8/2014 |
| DE | 102014212690 A1 | 8/2014 |
| WO | 2007140767 A | 2/2007 |
| WO | 2007/140767 A2 | 12/2007 |

* cited by examiner

BATTERY WATER-REFILL PLUG

CROSS REFERENCE TO RELATED APPLICATIONS

This application is the US-national stage of PCT application PCT/EP2016/000273 filed 18 Feb. 2016 and claiming the priority of German patent application 102015012175.8 itself filed 23 Sep. 2015.

FIELD OF THE INVENTION

The invention relates to a water-refill plug for automatically filling and refilling cells of a battery and comprising a valve body that is actuated by a float and closes the valve when the battery cell is full in order to end the refilling.

BACKGROUND OF THE INVENTION

During the electrical charging of batteries, water is electrolyzed during charging. In order not to reduce the service life and performance of the battery, water must therefore be refilled regularly into the battery cells. This is often achieved by means of water-refill plugs plugged into the fill opening of the battery cover and connected in series with the aid of conduits. These water-refill plugs close automatically when the fill level in the battery cells has reached the desired point. The fill level in the cells is often determined with the aid of floats. The movement of the float is transferred to the valve body via a rod assembly, so that the valve closes when the desired fill level has been reached, as is known from WO 83/00260 [U.S. Pat. No. 4,512,378].

As a result of the charging and discharging processes, impurities form in the battery cells that float on the electrolyte surface and deposit on the parts of the refilling plugs that come into contact with the electrolyte. This can lead to sticking of the rod assembly and thus to the malfunctioning of the refilling plug.

A water-refill plug is known from DE 35391671 where the upper head of the float forms the valve body and, in its upper position, seals the valve seat. A retaining element projects upward on the head of the float body, rests with a ferromagnetic part against a permanent magnet, and is held thereby in this position. Detachment is achieved by means of a pressure pulse transmitted through the refill conduit.

OBJECT OF THE INVENTION

It is the object of the invention to provide a water-refill plug with a simple construction that ensures reliable functionality even in case of contamination of the electrolyte.

SUMMARY OF THE INVENTION

According to the invention, this object is achieved in that a permanent magnetic force is exerted between the valve body and the float so that movement of the float is transferred to the valve body.

In this solution, no rod assembly is necessary between valve body (or valve control element) and float, so sticking or blockage cannot occur even in case of contamination of the electrolyte, thus ensuring reliable functionality over extended periods.

It is advantageous that valve body and float are not mechanically connected to one another.

An especially simple construction with a high level of functional reliability is achieved if a permanent magnet is provided on or in the float, with the magnets being fastened so as to be poled such that they repel each other, so that lifting of the float results in lifting of the valve body into its closed position.

One advantageous alternative solution consists in providing a permanent magnet or a part made of ferromagnetic material on or in the valve body and a permanent magnet on or in the float, the latter moving the valve body through its attractive force.

Another advantageous alternative solution consists in providing a permanent magnet or a part made of ferromagnetic material on or in the float and a permanent magnet on or in the valve body, the latter being moved by the float through the magnetic attractive force.

Preferably, the permanent magnet and/or the part made of ferromagnetic material are annular. The valve body is held securely in its closed position if the valve body is by the force of the flowing water toward its closed position.

BRIEF DESCRIPTION OF THE DRAWING

Embodiments of the invention are illustrated in the drawings and described in further detail below.

SPECIFIC DESCRIPTION OF THE INVENTION

Figure 1:
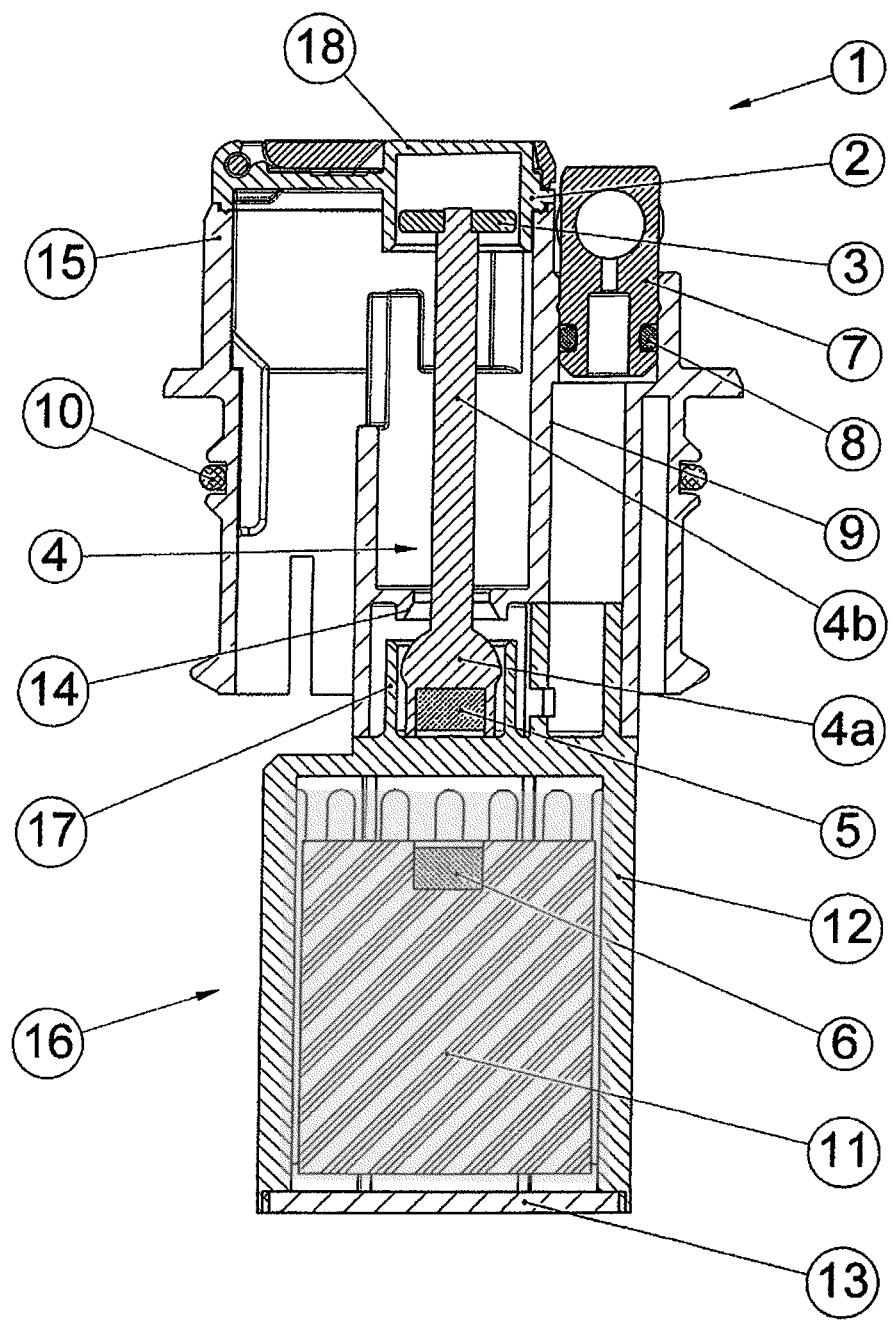
FIG. 1 shows a vertical axial section through a first embodiment of the water-refill plug.

The water-refill plug 1 has a substantially cylindrical housing 15 that is plugged into the opening of a battery cover above a battery cell. A gasket ring 10 in an annular groove on the outside of the housing seals the plug in the fill opening of the battery cover. A T-connector 7 is plugged with an O-ring 8 into the upper side of the plug 1 to which water hoses are plugged and through which distilled water is conducted via the T-piece 7 to the inside of the plug.

A float housing 16 is fastened to the underside of the housing 15 that forms a basket 12 with a floor 13 for a float body 11 that can move vertically by the electrolyte from the lower position shown in FIG. 1 into an upper position. A first permanent magnet 6 is fastened in or on the upper end of the float body 11.

The float housing 16 is formed at its upper end with an upwardly projecting guide collar 17 that is upwardly open and in which a lower thickened end of a vertically displaceable valve body 4 rests, with a lower large-diameter end forming the closing part 4a of the valve body 4. The collar 17 guides the closing part 4a for vertical movement upward until the closing part 4a reaches and blocks a valve seat 14 that is formed by an inner conduit 9 of the housing 15. A valve body rod 4b extends vertically upward from the closing part 4a on whose upper end a member 3 sits that is guided in a downwardly open guide recess 2 of an upper part 18 of the housing 15.

A second permanent magnet 5 in the closing part 4a of the valve body 4 is vertically above the first permanent magnet 6. If water is refilled into the battery cell via the T-piece 7 and via the plug 1, the float 11 rises with its magnet 6. Since the mutually facing poles of the two magnets 5, 6 have the same polarity, the two magnets repel each other and the float magnet 6 presses the closing part 5 upward until the valve of the parts 4 and 14 is closed and the flow of water is stopped.

Figure 2:
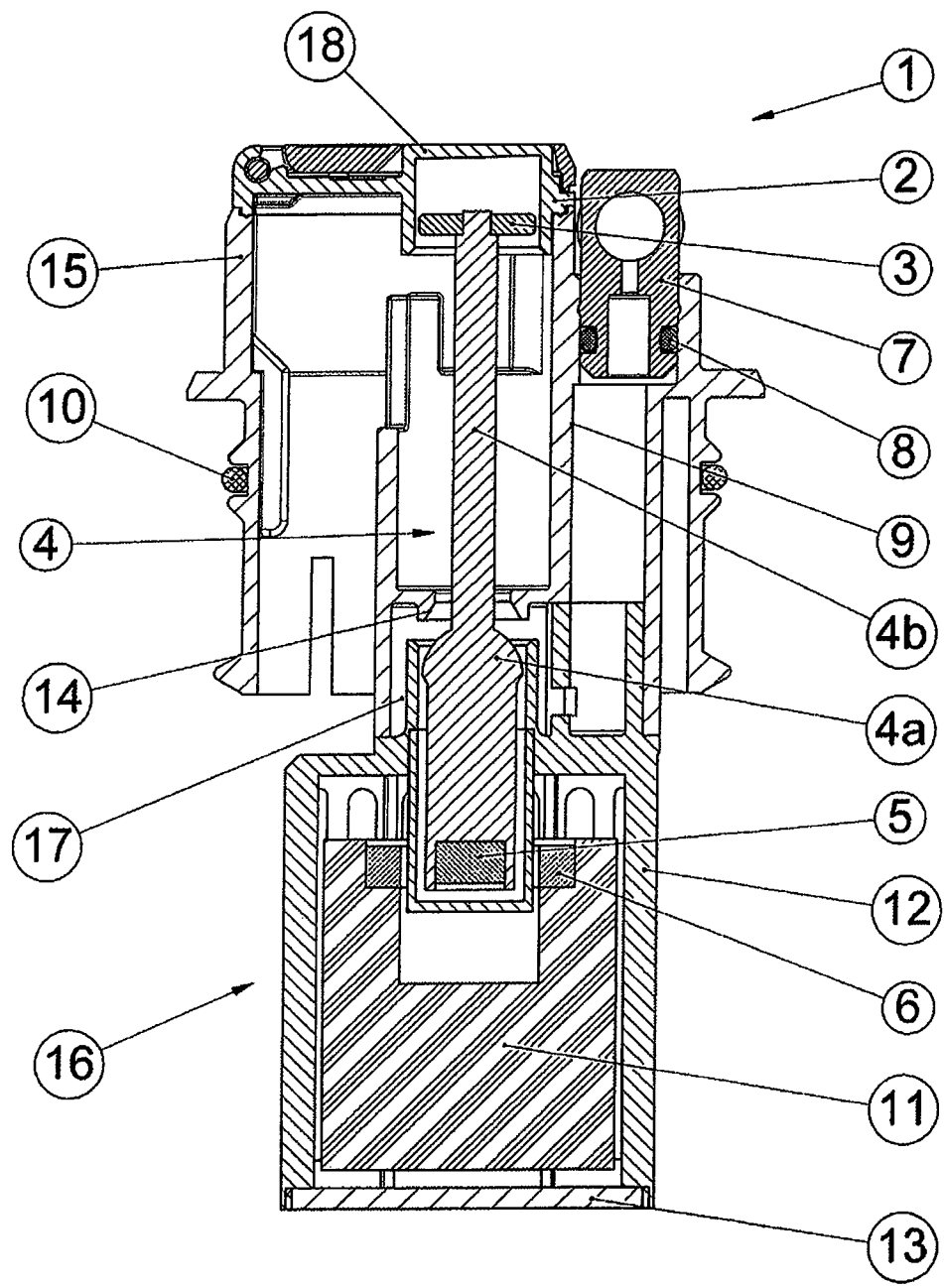
FIG. 2 shows a vertical axial section through a second embodiment of the water-refill plug.

The embodiment shown in FIG. 2 differs from the first inter alia in that only one permanent magnet 5 is present, which acts with attractive force on a part ferromagnetic material. Here again, the lifting of the float 11 brings about the lifting of the valve body 4. FIG. 2 shows that the permanent magnet 5 is on the closing part 4a and the part 6 made of ferromagnetic material is on the float 11. Instead, however, the permanent magnet can also be fastened to the float and the part made of ferromagnetic material can be fastened to the closing part. In both embodiments, the magnetic attractive force is exploited so as to move the valve body 4 upward using the float 11 in order to close the valve with a sufficiently high liquid level of the electrolyte.

The permanent magnet and/or the part made of ferromagnetic material can be annular, so that of these parts can fit through the other of the parts. Distilled water flowing through the valve 4, 14 can also be guided such that the valve body (4) is urged by the flowing force of the flowing water toward its closed position and held securely.

The invention claimed is:

1. In combination with a battery having cells, a water-refill plug for automatically filling and refilling the cells of the battery, the plug comprising:
    a housing extending down into and opening into one of the cells, forming a downwardly open valve seat, connected to a source of water, and forming an upper guide above the valve seat and a lower guide therebelow;
    a float body adapted to move vertically in the housing below the seat in one of the cells of the battery and floating in the one cell;
    a valve body vertically movable independently of the float body, having an upper end vertically slidable in the upper guide and a part below the seat and vertically slidable in the lower guide, the valve body being shiftable between an upper position with the part blocking the seat and preventing flow of water from the source through the seat into the one cell and a lower position below the seat and permitting such flow;
    a magnetically attractable or repellable element on one of the bodies for closing the valve when the respective cell is full in order to end the refilling; and
    a permanent magnetic on the other of the bodies exerting a force via the element between the valve body and the float body so the valve body is moved by the float body.

2. The water-refill plug defined in claim 1, wherein the valve body and the float body are mechanically not connected with each other.

3. The water-refill plug defined in claim 1, wherein the magnetically attractable or repellable element is another permanent magnet on or in the one body, the magnets being mounted so as to be poled such that they repel each other, so that upward movement of the float body results in the lifting of the valve body into its closed position.

4. The water-refill plug defined in claim 1, wherein the magnetically attractable or repellable element is made of ferromagnetic material.

5. The water-refill plug defined in claim 1, wherein the permanent magnet and/or the element are annular.

6. The water-refill plug defined in claim 1, wherein the valve body is urged by water flowing through the valve toward its closed position.

* * * * *